United States Patent
Kelada

[11] Patent Number: 6,019,126
[45] Date of Patent: Feb. 1, 2000

[54] REMOTE FUNCTION VERIFICATION OF LOW PRESSURE AND VACUUM RELIEF DEVICES

[76] Inventor: Maher I. Kelada, P.O. Box 2247, Pearland, Tex. 77581

[21] Appl. No.: 09/148,552

[22] Filed: Sep. 4, 1998

[51] Int. Cl.[7] ............................. F16K 17/26; G01B 7/14
[52] U.S. Cl. ...................... 137/493.8; 137/554; 137/556; 324/207.15
[58] Field of Search .................................. 137/554, 556, 137/493.8; 324/207.15, 207.22, 207.24, 207.16; 73/168, 1.72; 116/204, 277; 251/129.15

[56] References Cited

U.S. PATENT DOCUMENTS

| | | | |
|---|---|---|---|
| 3,250,293 | 5/1966 | Adams et al. | 137/528 |
| 3,701,368 | 10/1972 | Tirelli et al. | 137/625.65 |
| 3,791,408 | 2/1974 | Saitou et al. | 137/529 |
| 3,850,196 | 11/1974 | Fales | 137/554 |
| 3,967,648 | 7/1976 | Tirelli | 137/625.65 |
| 4,255,967 | 3/1981 | Grymonprez et al. | 73/168 |
| 4,257,445 | 3/1981 | Cook et al. | 137/493.8 X |
| 4,386,626 | 6/1983 | Hehl | 137/529 |
| 4,428,223 | 1/1984 | Trevisan | 73/4 R |
| 4,491,111 | 1/1985 | Eheim et al. | 137/614.21 |
| 4,504,198 | 3/1985 | Toyda et al. | 417/417 |
| 4,548,233 | 10/1985 | Wolfges | 137/529 |
| 4,557,136 | 12/1985 | Greenghalf | 73/4 R |
| 4,572,237 | 2/1986 | Thompson | 137/487.5 |
| 4,651,670 | 3/1987 | Silverwater | 116/268 |
| 4,761,999 | 8/1988 | Thompson | 73/168 |
| 4,802,502 | 2/1989 | Williams | 137/554 X |
| 4,949,288 | 8/1990 | Bookout | 364/558 |
| 5,036,275 | 7/1991 | Munch et al. | 324/207.17 |
| 5,048,560 | 9/1991 | Janotta et al. | 137/493.8 |
| 5,144,977 | 9/1992 | Eggerton et al. | 137/554 |
| 5,210,490 | 5/1993 | Munch et al. | 324/207.17 |
| 5,224,512 | 7/1993 | Nogami et al. | 137/554 |
| 5,236,012 | 8/1993 | Lin | 137/554 |
| 5,275,036 | 1/1994 | Shculz et al. | 73/4 R |
| 5,311,903 | 5/1994 | Poulin | 137/554 |
| 5,323,142 | 6/1994 | Fain | 137/554 X |
| 5,442,957 | 8/1995 | Caron | 73/168 |
| 5,497,725 | 3/1996 | Thiesen et al. | 116/277 |
| 5,583,434 | 12/1996 | Moyers et al. | 137/554 X |
| 5,620,024 | 4/1997 | Yonezawa | 137/554 |

Primary Examiner—Denise L. Ferensic
Assistant Examiner—Joanne Y. Kim
Attorney, Agent, or Firm—Russell J. Egan

[57] ABSTRACT

A method and system for automatically verifying the function of pressure and vacuum relief valves for low-pressure storage vessels and tanks, which can be remotely operator actuated to insure venting when emergencies occur, allows for on-line verification of the relief valve functionality and proper operation. The system periodically checks the set pressure of the valve by attempting to lift its pallet and measures the deviation from a set point. It also indicates unplanned occurrence of valve lifting, as a result of unforeseen upset in storage vessel pressure. This apparatus is electrically operated and controlled and relies on electromagnetic means for tractive or pull-force, as well as for detecting valve lifting.

36 Claims, 9 Drawing Sheets

REMOTE FUNCTION VERIFICATION OF LOW PRESSURE AND VACUUM RELIEF DEVICES

BACKGROUND OF THE INVENTION

1. The Field of the Invention

The present invention pertains to a method and system for verifying the functionality of venting or relief valves required to control internal pressure or external pressure (vacuum) in storage tanks to prevent the explosion or implosion thereof. More specifically, the invention is concerned with remotely and on-line checking of the set pressure of the relief valve by periodically attempting to open the valve and measuring the deviation from the set point of the force required to open the valve. It also provides for indicating unplanned events of valve venting.

2. The Prior Art

Bulk liquid industrial products with relatively low vapor pressure are normally stored in storage vessels and flat bottom tanks. These liquid containment vessels are designed for low-pressure services not to exceed 15 psig. Due to changes in the level within the storage vessel, upon filling and evacuation, of its liquid content and also to accommodate temperature variation, it becomes apparent that a vent nozzle is required to allow for vessel breathing. In nonhazardous service, such as water storage, a vent open to the atmosphere, such as a gooseneck, is an acceptable practice. For combustible commodities with minimum ecological adverse effects, an atmospheric vent with an in-line flame arrester will be considered as a minimum requirement for safe storage. For hazardous material, such as benzene (or other volatile petroleum products), an open vent is no longer safe nor environmentally acceptable. Therefore, vents from such storage vessels are connected to vapor recovery or destruction systems. Since these vapor mitigation means are subject to failure, vessels are protected with emergency relief valves to mitigate pressure upset conditions without damaging the vessel or causing the spillage of its contents. These relief valves should be designed for low pressure or low vacuum or combinations of low pressure and low vacuum. Some of these relief valves are weight-loaded while others are spring-loaded. In all such relief valves, a disk, commonly known as a pallet, engages a seat integral to the relief valve housing and mounted on a relief nozzle of the vessel. This pallet maintains a seal under a force imposed by a weight or a spring. The imposed force is at or below the allowable working pressure of the storage tank. The required pressure to initiate the lifting of the pallet and opening of the valve for venting is called "set pressure." These relief valves are passive devices that will open, or lift, in response to pressure changes within the vessel that exceed the set pressure. These valves allow for venting or inducing air (or inert gas) to maintain an acceptable pressure within the vessel.

The cost of a storage vessel is relatively proportional to its volume and its design pressure. For large vessels, it becomes economically prohibitive to design such vessels for more than few pounds of pressure. In fact, the internal design pressure of many of the large vessels is less than 3 psig with external design pressure (vacuum) of less than ½ psig (8 ounces). For a given tank shell thickness, the ability of the vessel cylinder to contain internal pressure is much greater than its ability to sustain external pressure. Therefore, relief valves for internal pressure are normally designed for a higher set point than that for external pressure.

Despite the fact that many vessels followed proper design guidelines and are provided with relief valves and other safety devices that should prevent their damage, it is not unusual to find imploded and ruptured storage vessels in tank farms and liquid loading and storage facilities. In fact, vessel failure in many of these cases is attributed to the failure of the relief valve to function. A relief valve malfunction is most often due material build up at the valve seat, causing the pallet to stick in place and not allowing it to lift properly for relief of the upset pressure condition.

This phenomenon has intrigued many inventors and inspired them to find means to monitor and test such relief valves to insure their proper function. Examples of known approaches to devise means to monitor relief valve action or to test its set pressure are described in the following patents.

U.S. Pat. No. 5,497,725 to Theisen et al describes a device for providing visual indication and record of the actuation of a tank vent opening. It comprises a rod contacting a tank vent pallet at one end, and a magnet affixed to the other end of the rod, which moves in a chamber adjacent to a vertically positioned rotationally mounted magnetic wafer with distinguishable sides. Movement of the magnet, occasioned by the opening tank vent, will flip the wafers, but will not affect the wafers when the magnet goes down after the vent is closed.

U.S. Pat. No. 4,255,967 to Grymonprez et al describes a local method for testing the setting of a valve, comprising a valve member biased toward a valve seat, a hydraulic or pneumatic pulling device is engaged with the valve member and operated to apply a tractive force opposed to the bias which is just sufficient to separate the valve member from the valve seat. This force is indicated by a suitable gauge and is proportional to the tractive force. The sum of the tractive force and the force acting on the valve from inside the vessel, as measured by another pressure gauge, is indicative of the setting of the valve.

U.S. Pat. No. 4,428,223 to Trevisan describes an apparatus for periodically testing the operation of safety valves on pressure apparatus or vessels and comprises a thrust generating assembly mounted on a load bearing structure for gripping the valve being tested. A dynamometer device measures the force applied by the thrust generator to the safety valve.

U.S. Pat. No. 4,761,999 to Thompson describes a test apparatus for measuring the set pressure of a valve coupled to a port in a pressure line. The valve includes a closure element movable between a first limit position sealing the port and a second limit position opening the port. A spring-loaded element is provided for biasing the closure element toward said first limit position. An expandable diaphragm device is provided which, upon the introduction of air pressure into an airtight chamber defined by a movable piston, the diaphragm and the base element, is adapted to apply a force to the closure element in a direction opposite to the direction of the bias provided by the spring load means. An element for calculating the set pressure of the valve is also provided.

U.S. Pat. No. 4,557,136 to Greenhalf; U.S. Pat. No. 5,620,024 to Yonezawa; U.S. Pat. No. 4,572,237 to Thompson; U.S. Pat. No. 4,651,670 to Silverwater; U.S. Pat. No. 5,275,036 to Schulz et al; and U.S. Pat. No. 4,949,288 to Bookout are similar inventions that comprise mechanical means for relief and safety valve testing and detection.

SUMMARY OF THE INVENTION

The present invention describes a method and system to automatically verify the functionality of pressure and vacuum relief valves for low-pressure storage vessels and tanks. The subject invention also allows remote operator actuation of the relief valve to insure venting when emergencies occur. This method allows for on-line verification of relief valve functionality and proper operation. The system periodically checks the set pressure of the valve by attempting to lift its pallet and measure any deviation from a set point. It also indicates unplanned occurrence of valve lifting as a result of unforeseen upset in storage vessel pressure. Unlike the aforementioned relief valves, the present invention is electrically operated and controlled.

It is, therefore, an objective of the present invention is to provide a method and a system to determine proper functionality of low pressure relief valves and their capability to perform as intended, by verifying its set pressure point.

It is another objective of this invention to provide a system which relies on electromagnetic means for tractive or pull-force as well as for detecting valve lifting.

It is further an objective of the present invention to provide a relief valve suitable for relieving both internal pressure or external pressure (vacuum) or both applications.

It is yet another objective of this invention to provide an on-line, automatically or manually controlled relief valve function verification system.

Still another objective of this invention is to provide a remotely controlled valve, whose function can be easily annunciated on a panel or a distributive control system (DCS) in any operating control room.

Still another objective of this invention is to provide a means to account for unplanned or uncontrolled lifting of the relief valve in response to unforeseen or unpredictable pressure upset events in the tank, which could be an indication of possible failure in normal venting means.

It is also another objective of this invention to provide a means to continuously measure positive and negative pressure fluctuation in the storage vessel and archive this data for reference.

It is still another objective of this invention to provide a relief valve function verification system which is simple, easy to install and maintain, yet requires minimum modification to existing relief valves.

An additional objective of this invention is to provide an electrically safe and risk free relief valve suitable for use in any hazardous service and which meets electric codes.

BRIEF DESCRIPTION OF THE DRAWINGS

The present invention will now be described, by way of example, with reference to the accompanying drawings, in which.

DETAILED DESCRIPTION OF AN EMBODIMENT OF THE INVENTION

The present invention is a method and apparatus to remotely verify that pressure relief valves provided for the protection of low pressure storage tanks, vessels and the like, are functional at all times and are not operationally impaired.

Figure 1:
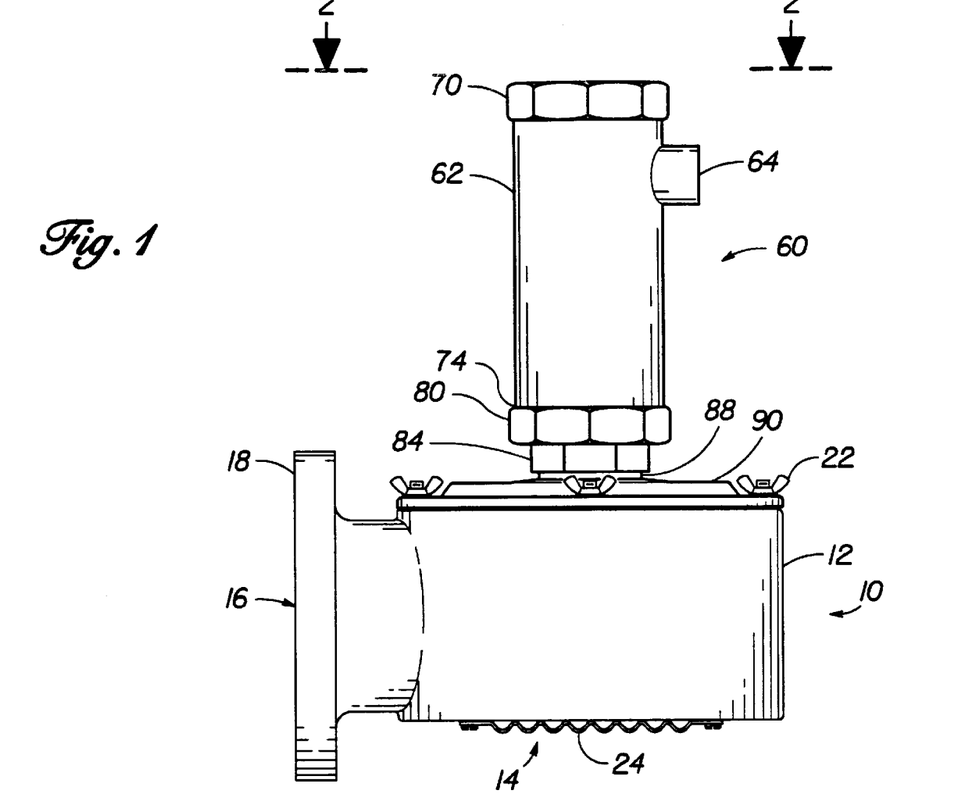
FIG. 1 is a side elevation of an embodiment of present invention mounted on conventional vacuum relief valve.
Figure 2:
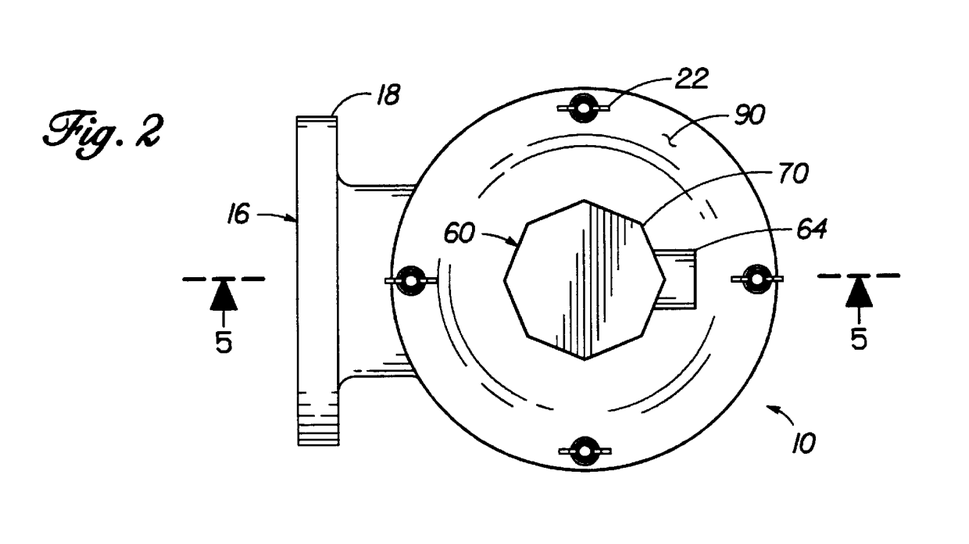
FIG. 2 is a top plan view of the embodiment of present invention shown in FIG. 1.
Figure 3:
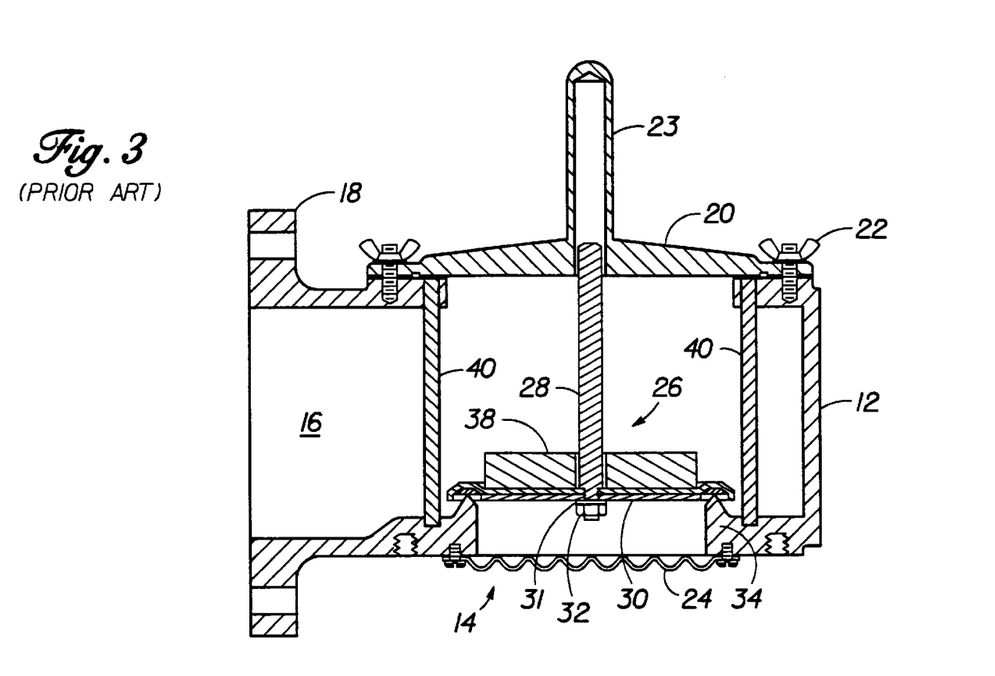
FIG. 3 is a vertical section through a conventional vacuum relief valve representative of the prior art with an atmospheric air vacuum breaker and side mounting flange.
Figure 4:
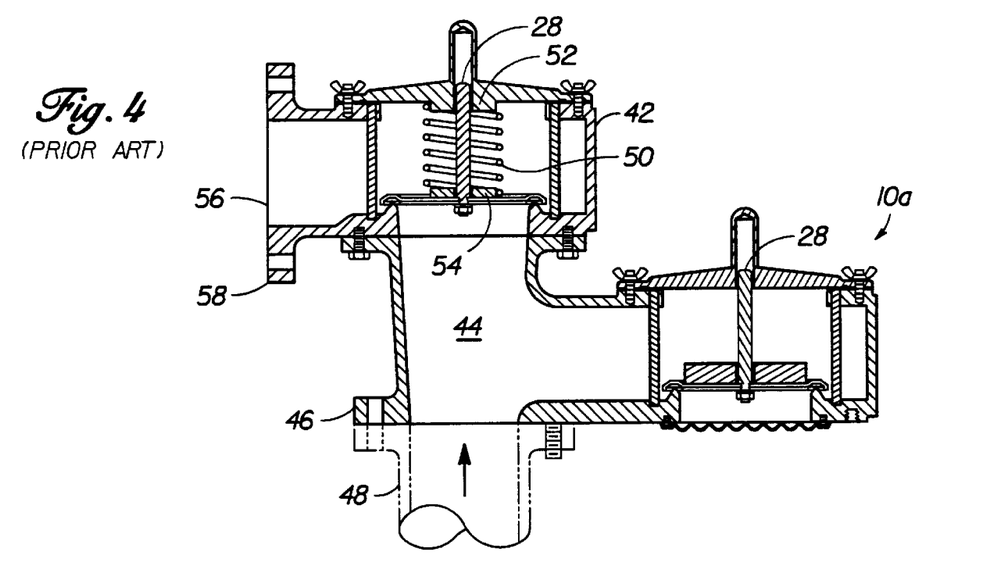
FIG. 4 is a vertical section through a conventional pressure and vacuum combination relief valve with an atmospheric air vacuum breaker and flanged vent connection.

Turning now to FIGS. 1 to 4, the illustrated embodiment of the subject verification system 60 can be mounted on a tank vacuum relief valve (FIG. 3), pressure relief valve (shown on the left of FIG. 4), or on a combination of vacuum and pressure relief valves (FIG. 4). These pressure relief valves are used to reduce pressure differentials between the interior and exterior of a low pressure storage vessel to prevent either explosion or implosion of the vessel. FIG. 1 is a side elevation of the present invention 60 mounted on a conventional vacuum relief valve 10, while FIG. 2 is a top plan view of the same arrangement. These relief valves are depicted in FIGS. 1 to 5 and 8 to 11 and are briefly described to show how they can be adapted to accommodate the subject invention.

The known pressure relief valve 10 has a body 12 with both an inlet port 14 and an outlet port 16. The outlet port can be vented to the atmosphere or to a vent system (not shown) using a connection 18. A cover plate 20 is secured to the valve body 12 by means of wing nuts 22 or equivalent securing device. A screen 24 is provided across the valve inlet port 14 to prevent insects, small birds, etc. from accidentally entering the valve cavity when the valve is open. The pressure relief valve has a pallet assembly 26, which consists of a stem 28 the lower end of which is passes through the center of a pallet disk 30 and is secured thereto by means of a sealing gasket 31 and a lock nut means 32. The pallet stem 28 extends through the valve cover 20 in a protruded or threaded sleeve 23 in the top center of the cover so as to maintain alignment of the pallet assembly 26 with respect to its annular seat 34. Free movement of the pallet is maintained at all times. The pallet has been shown as a two disc assembly with the upper disc having a downwardly directed peripheral recess containing an annular gasket 36 of malleable material. This gasket 36 engages the annular seat 34, which is integral with the body 12 of the valve. To set the valve opening pressure, a circular plate 38 of a calibrated weight is coaxially mounted on the stem 28. Pallet guides 40 are provided spaced around the valve housing to define a pallet path and to restrict movement of the pallet to only the vertical.

Referring to FIGS. 1 and 2, the subject verification system 60 comprises an explosion proof cylindrical housing 62 mounted vertically on top of a modified cover of a conventional pressure relief valve 10. Preferably the housing 62 is formed from a durable metal, such as stainless steel, to withstand harsh environmental conditions.

FIG. 4 shows a vacuum/pressure relief combination according to the prior art. The vacuum relief valve 10a is identical in function to that described in FIG. 3 except for the outlet connection means. The pressure relief valve 42 is also of a similar design, but since these valves or normally set for higher set point than the vacuum valve (FIG. 3), springs in compression are frequently used to provide a force load. Both the pressure and vacuum valves are mounted on a cast housing 44 having a flange 46 which is mounted to on the storage tank vent nozzle 48. The relief pressure valve 42 is shown with a spring 50 which is retained in place with upper and lower rings 52 and 54, respectively. The outlet relief valve port 56 opens directly to the atmosphere or preferably is connected to a vent header (not shown) via flange 58.

Figure 5:
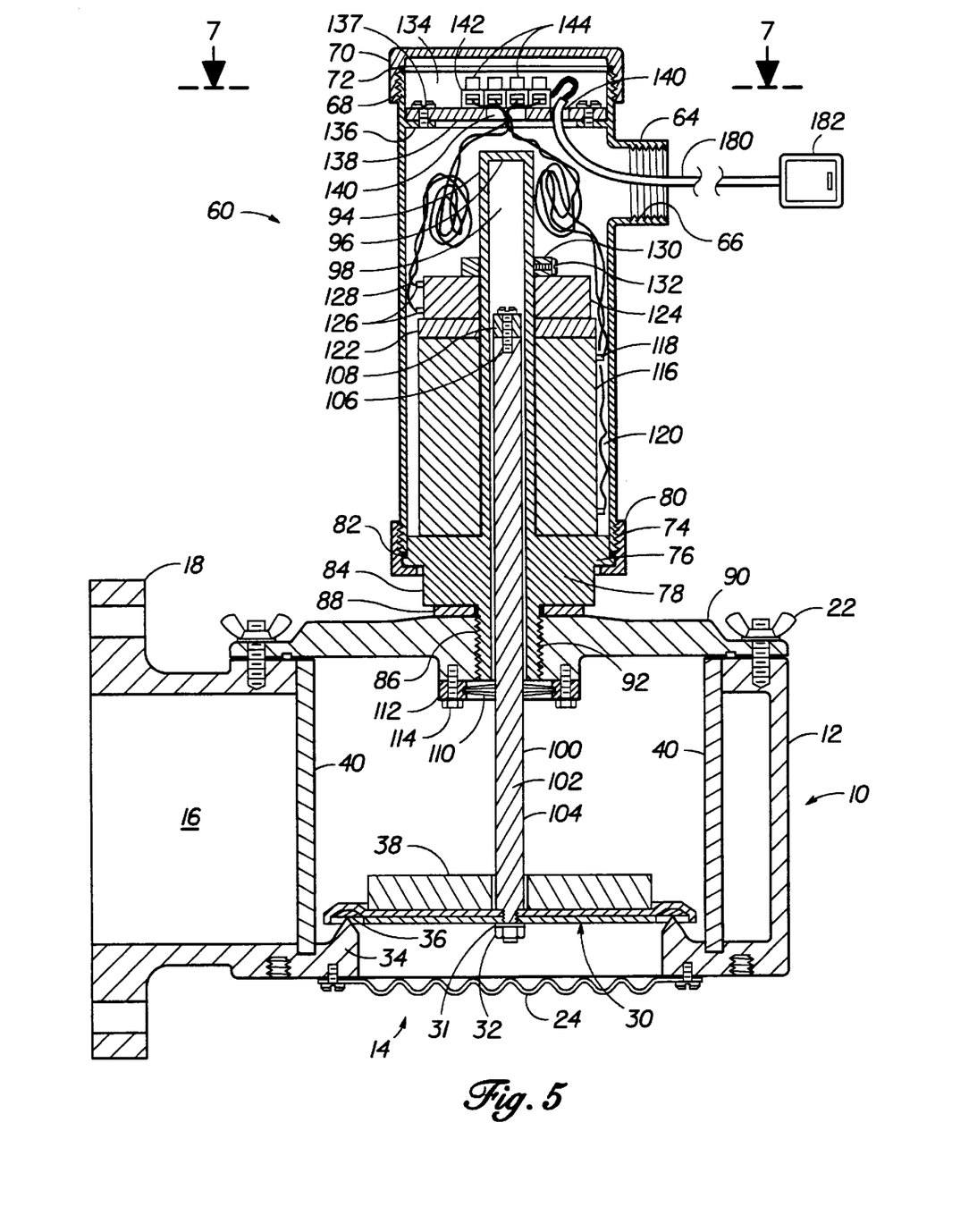
FIG. 5 is a vertical section through an explosion proof embodiment of present invention.
Figure 8:
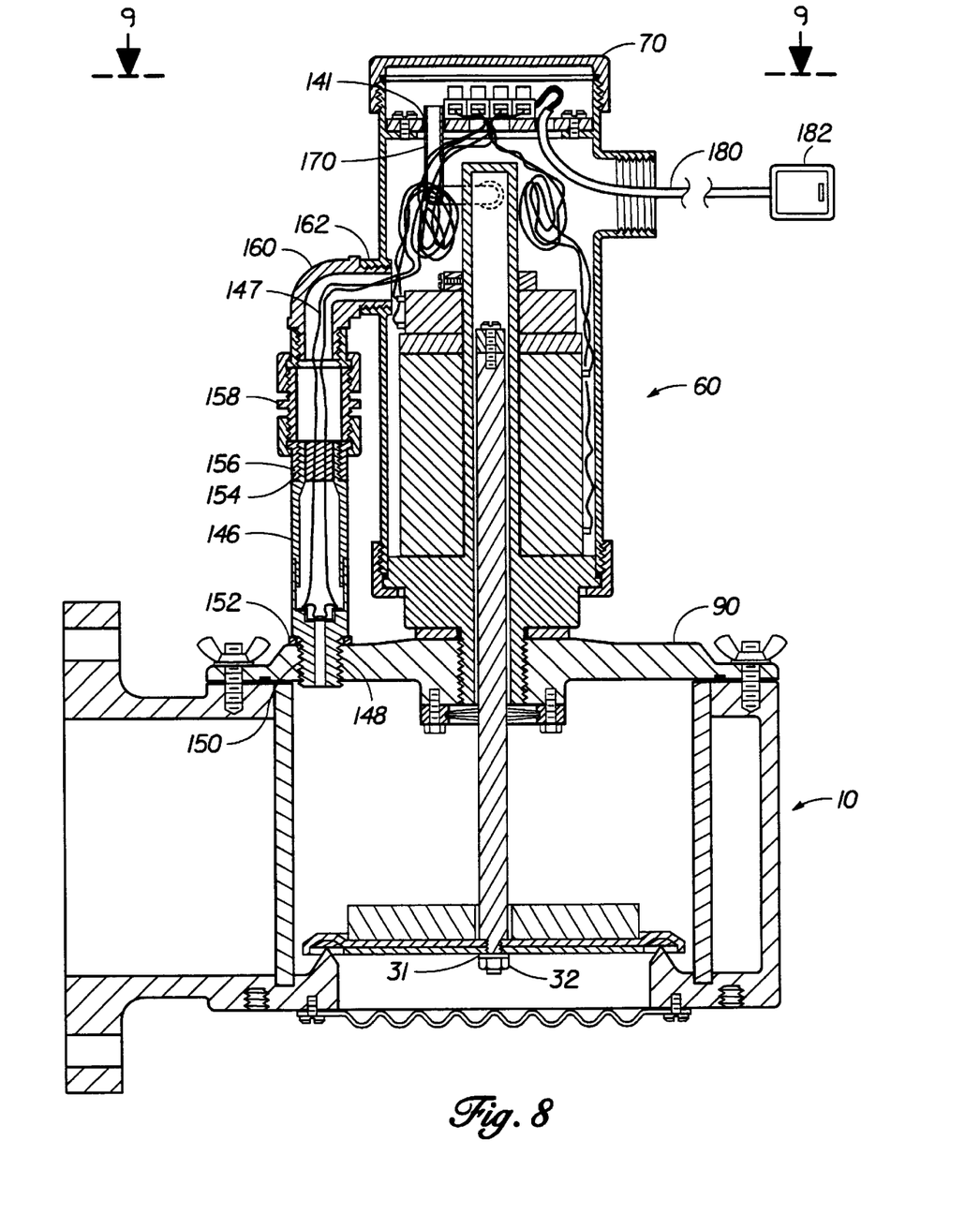
FIG. 8 is a vertical section through an alternate embodiment of the present invention showing an external pressure measurement.
Figure 10:
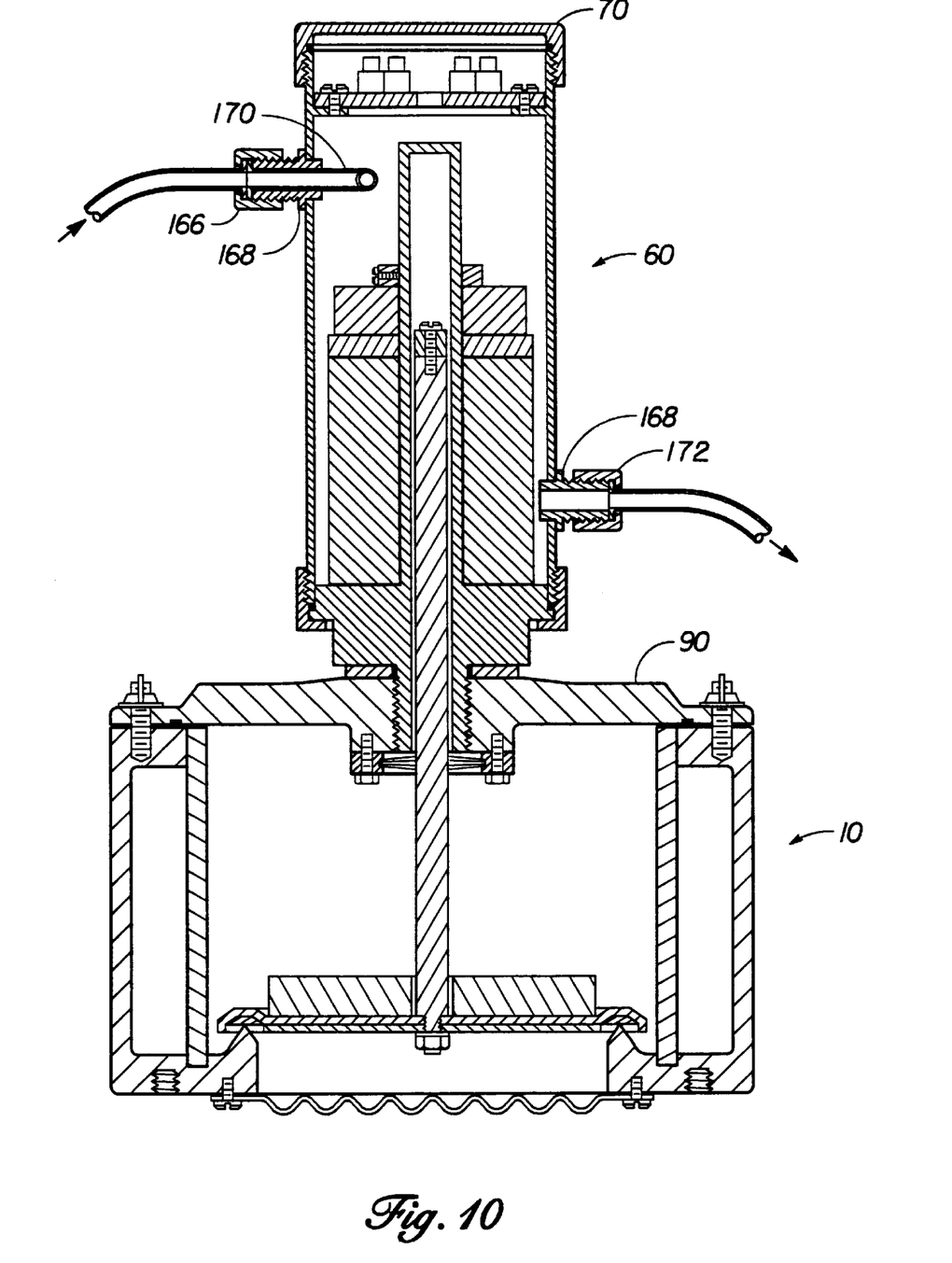
FIG. 10 is another vertical section through an embodiment of the present invention showing inert gas purging means placed at 90° apart for the pressure measurement means.

Returning to the subject invention 60, and referring to FIGS. 5, 8 and 10, the housing 62 has a conduit port 64 which is threaded 66 to accommodate an explosion proof conduit fitting (not shown). The housing 62 has, at its upper end, first outer threaded portion 68 which receives thereon a threaded cap 70 for enclosing the internal wiring terminal block. The cap 70 is threaded onto the housing threaded portion 68 and tightly sealed by gasket 72. The housing is also provided with threaded portion 74 which engages a mounting assembly 76 consisting of a heavy base or shank 78, to support the housing assembly, and a locking nut 80, to secure the housing 62 to the mounting assembly 76. A gasket 82 is placed between the bottom end of the housing 62 and the shank 78 to insure proper seal, as required for explosion proof devices. The housing mounting assembly 76 has an externally threaded portion 86, with an axial bore, depending therefrom to engage a threaded port 92 in the modified cover 90 of the relief valve. The mounting assembly 76 has a hexagonal external profile 84 to facilitate threading the assembly through the cover using conventional tools. Annular gasket 88 is placed between the mounting block 76 and the relief valve cover to maintain proper seal.

Figure 6:
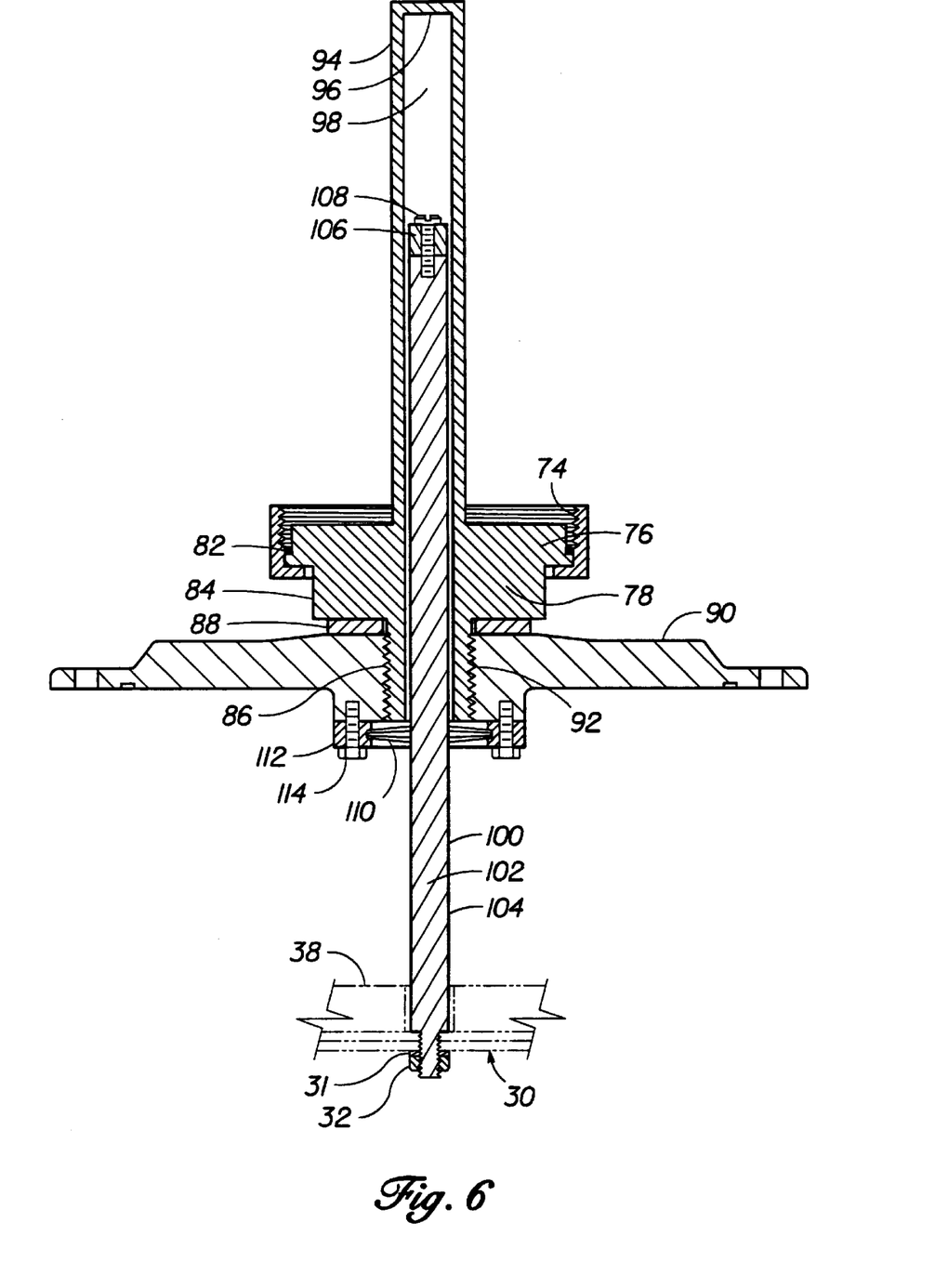
FIG. 6 is a detailed vertical section through parts of the present invention needed to upgrade conventional relief valves.

FIG. 6 is a side elevation of the parts needed to upgrade a conventional pressure relief valve to the subject invention. The primary change is in the relief valve cover and pallet stem. The mounting assembly 76, as described with reference to FIG. 5, has an axial, blind bore extension 94, with closed end 96, which acts as an extended housing and guide for the pallet stem 100. Extension 94 also serves as the support for a solenoid coil 116 and a magnetic displacement indicator coil 124 (see FIG. 5). The bore 98 of the extension 94 is completely isolated from the electrical wiring and contacts. This extension 94 is preferably made of a non-magnetic material, such as stainless steel or suitable polymeric substance, to avoid interference with the magnetically susceptible iron stem 100. The bore 98 is sized to accommodate free axial movement of the stem 100 with adequate freeboard to allow for pallet opening and closing. This stem 100 has an iron shaft 102 and, since it is exposed to the fluid in the storage tank, the shaft 102 is coated with suitable corrosion resistance material 104, such as Teflon. The stem 100 is secured to the pallet assembly 26 with locking nut means 32 as described earlier. A permanent magnet 106 is attached to the upper end of the stem 100 by a screw 108, or any other suitable attachment means. This magnet 106 is preferably located between the upper end of the solenoid coil 116 and the lower end of the magnet displacement indication coil 124, as shown in FIGS. 5 and 8.

An annular brush 110 of resilient fibers is mounted by annular member 112 to the relief valve cover 90 with the pallet stem 100 passing concentrically therethrough. The annular member 112 is secured to the modified relief valve cover 90 by means of suitable attachment means 114. The annular brush 110 serves as a filter media to retard penetration of process fluid particles into the bore 98 while maintaining a loose and flexible structure that will not adhere to the stem 100 or hinder its movement.

All electrical parts are intentionally placed outside the sealed extension 94 to insure process safety. A solenoid coil 116 is placed around the mounting assembly 76 at the base of the extension 94 to provide the required tractive force to lift the pallet. The solenoid coil 116 has electrical terminals 118 connected into the terminal housing 134 in the head of the housing 62 by means of wiring 120. Placed directly above the solenoid coil 116 is a spacer plate 122, which isolates the solenoid coil 116 from the magnetic displacement indicator coil 124. The spacer plate 122 is made of a non-conductive and non-magnetic material, preferably a polymeric, fire retardant substance. The magnetic displacement indicator coil 124 is a magnetic induction current coil has two leads 126a and 126b connected to the terminal housing 134 at the head of the housing 62 by means of wiring 128. The magnetic displacement indicator coil 124 is secured in place by means of a non-magnet, non-conductive retention disk 130, which is secured to the extension 94 by means of screws 132.

All lead wires are terminated in termination housing 134 and are readily accessible at the top of the housing 62. The wire termination blocks 142 are placed within the termination housing 134 on a support disc 138, which is mounted on an inwardly directed annular support flange 136 extended from housing 62. The disc 138 is secured to flange 136 by means of screws 137 or similar attachment means.

Figure 7:
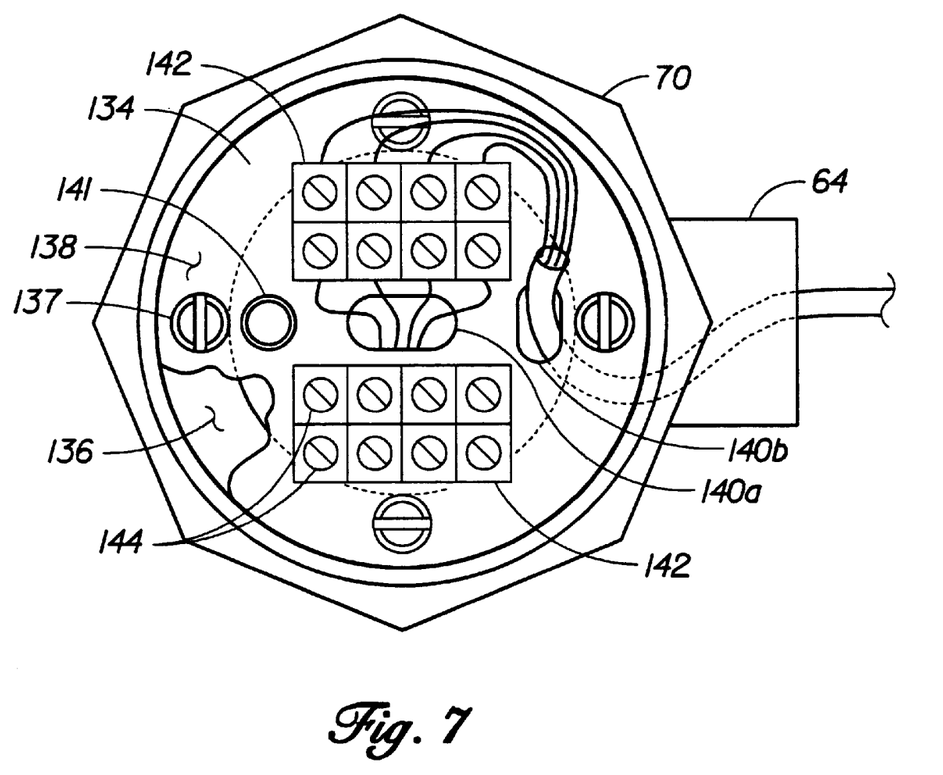
FIG. 7 is a top plan view of wire termination housing of the present invention.

FIG. 7 is a top plan view of wire termination housing 134. The termination support disc 138 is preferably a circular disc of non combustible material, such as ceramic, having thereon an even number of fixed termination blocks 142. Each block has two screws 144 for attaching incoming wiring from each electric device in housing 62 and their counterpart outgoing wiring to a remote control system (not shown). A preferred method to layout wiring is to keep the incoming wiring from the different devices on the inside terminal blocks, while the outgoing conduit wires are on the outside terminal blocks. Two or more wire passage holes or slots 140a and 140b are provided through the terminal block support disc 138. As shown, slot 140a is used for incoming wires while slot 140b is used for outgoing wires. A third hole 141 is used for an inert gas conduit, if purging becomes a requirement.

FIG. 8 is a vertical section through an alternate embodiment of the present invention showing an external pressure measurement means 146. In this second embodiment, means are provided to continuously measure positive and negative pressure fluctuations in the storage tank and to integrate these measurements in a control scheme to override the normal sequence of relief valve testing. The pressure measurement means 146 shown is of the transducer type having a threaded end 148 engaged in a threaded port 150 in the modified relief valve cover 90. A seal is maintained with the cover by a suitable gasket material 158. The other end of the transducer 146 is threaded 154 to engage an explosion proof tandem union 158 to facilitate part replacement without dismantling the complete device. The union 158 connects to an elbow 160, which is mounted on a threaded connection on the housing 62. The transducer lead wires 147 extend through the union 158 and elbow 160 fitting and are connected to the terminal blocks 142 in the wiring termination housing 134.

Figure 9:
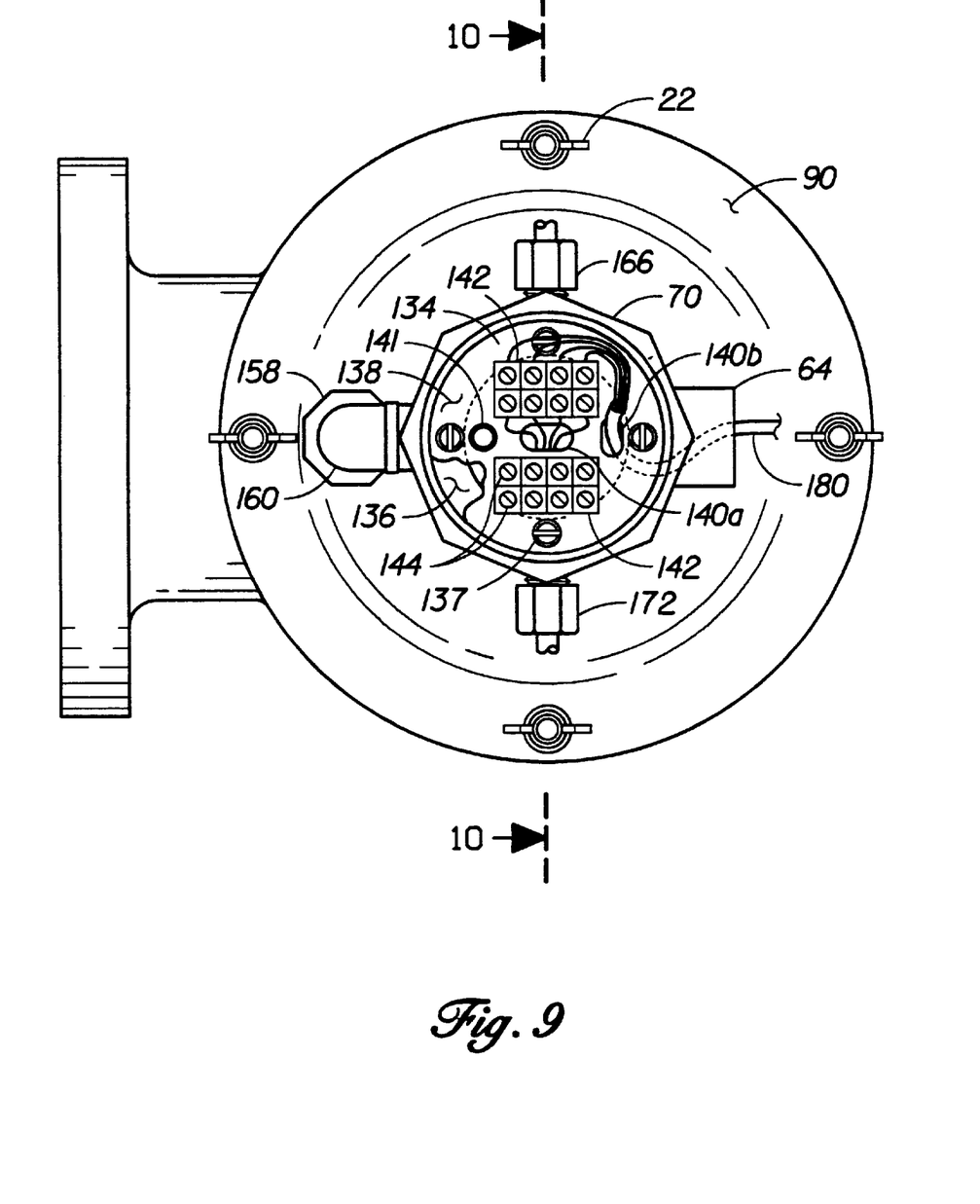
FIG. 9 is a top plan view of the alternate embodiment of the present invention shown in FIG. 8 with an external pressure measurement and optional inert gas purging means.

FIG. 9 is a top plan view of this second embodiment showing the layout of the pressure measurement and a section through the wiring termination housing, as well as optional inert gas purging connections. These purging connections could be provided in conjunction with a pressure transducer, as shown in FIG. 8, or could be independent of pressure measurements, as shown in FIG. 10, which is another vertical section through the second embodiment of the present invention as depicted in FIG. 8.

FIG. 10 shows purging means 166 and 172 which are intended to maintain a low flow of dry air or inert gas under slight pressure to prevent intrusion of flammable gases inside the housing 62. The purging system (not shown) can be easily adapted to the subject invention with a simple mounting bracket. To facilitate circulation of the purge gas, a tube 170 attached to the inlet fitting 166 is extended through a hole 141 (see FIGS. 8 and 9) in the terminal block disc 138. The gas is passed downwardly from the termination housing 134 through the holes in the terminal block disc, to the system housing 62, thereafter to the outlet fitting 172. inert gas purging connections 166 and 172 mounted on threaded fittings 168 which are secured to housing 62. Purging the housing with low flow of dry air or inert gas under slight pressure is intended to prevent intrusion of flammable gases inside the housing and avoid ignition of the gases upon contact with any sparking electrical element.

Figure 11:
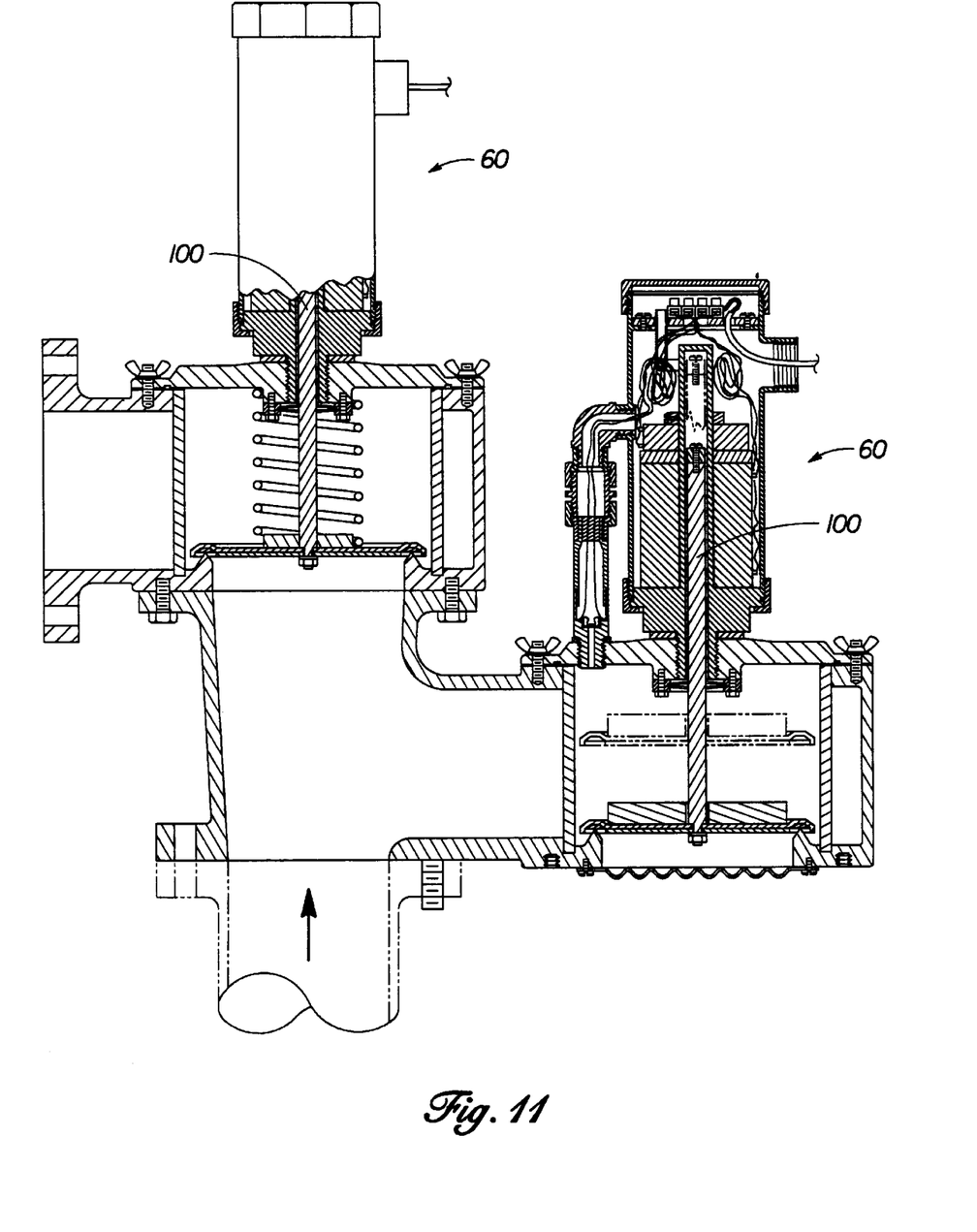
FIG. 11 is a vertical section through an of the embodiment of present invention mounted on the conventional pressure and vacuum combination relief valve shown in FIG. 4.

The subject invention can be used with vacuum relief valve or pressure relief valves or combinations of both types of relief valves. FIG. 11 is an example of multiple purpose application where the subject invention is installed on a combination pressure relief valve and vacuum relief valve. Only one pressure-measuring means is needed for a combination of valves and it should always be installed on the vacuum relief valve. Installation of pressure-measuring means on the cover of a pressure relief valve in a combination of valves would measure only the pressure of the vent header and not the pressure in the storage tank.

The embodiment shown in FIGS. 1, 2 and 5 to 11 has an electrically operated pull-force generating assembly, which acts upon a weight or spring loaded sealing element, to bias the set pressure force of the relief valve as imposed by such weight or spring. The generated pull-force disengages the pallet from its seat by lifting the assembly at a controlled, gradual and measurable rate. The size of the electrical pull-force means is determined by the required lifting force and the potential of the power supply. The principal of such device is based on the fact that the passage of direct electric current through a uniformly wound coil of wire, in the form of a cylinder having a length much greater than its diameter and commonly known as solenoid, creates a magnetic field that draws a core or plunger, usually of iron, into the solenoid. The solenoid is designed to lift a weight relatively greater than the set point of the relief valve and is calibrated accordingly. On-line power demand that deviates from the calibration data indicates a possible malfunction of the relief valve.

The present invention provides means to monitor and account for unplanned and uncontrolled lifting events of the relief valve. These events are mostly due to pressure upsets in the tank or to significant change in atmospheric barometric pressure (such as a hurricane). Relief valve lifting under these conditions could be an indication of improper equipment design or normal venting system restriction. The embodiment shown in the FIGS. 5, 8 and 10 illustrates a magnetic displacement indicator device 124 based on Faraday-Henry law of electromagnetic induction. This law states that in a varying magnetic field, an electromotive force (emf) is induced in any closed circuit, which is equal to the negative of the time rate of change of the magnetic flux through the circuit. The magnetic displacement indicator consists of a magnet mounted on the tip of the pallet stem of the relief valve and it moves upward and downward as the pallet opens and closes in response to pressure upsets in the storage tank. This magnet moves within the core of an electric conductor, such as a copper coil. As the magnet moves, the magnetic flux varies with time and, consequently, generates a measurable current in the circuit.

The present invention also utilizes real time pressure measurement data for system management providing both alarm and control. Real time pressure data can be obtained from pressure measuring devices (not shown) that might be available on the tank or from a dedicated pressure measuring device 146, as shown in FIGS. 8, 9, and 11. The principle of relief valve function verification is based on the fact that the relief valve should open at the set pressure for which the valve is calibrated. Deviation from this set point implies a malfunction of the valve and its inability to meet its design parameters. The system control (not shown) and function verification process is based on the following design criteria:

The set point of a relief valve is achieved by deadweight or by a spring in compression based on the cross sectional area of the sealing assembly. For example, if a vacuum relief valve has a 6-inch sealing pallet and is designed to lift at a vacuum of below atmospheric pressure, for example 0.25 psi, 7 pounds of weight will be required to insure that the valve will not lift before the set point is reached. In practice, calibration of relief valves is done under controlled environment and using pneumatic means to verify the set pressure.

The present invention requires some minor modifications of a conventional relief valve to include a substantially longer magnetically susceptible pallet stem and a revised relief valve housing cover, as shown in FIG. 6. This modification could result in a minor increase in the sealing assembly weight that may require weight adjustment and possibly system set pressure re-calibration.

The pallet lifting device shown and described is a solenoid 116 that employs the pallet stem 100 as its core. This solenoid is preferably powered by a low voltage direct current, such as a 24 Volt DC, power supply. This solenoid is designed to operate at a relatively slow cycle by a remote rate controlled potentiometer (not shown) integrated in the system programmable controller (also not shown). The solenoid is capable of providing ample force to lift the relief valve pallet from its seat or to dislodge it if it is stuck for any reason.

Lifting of the pallet is done regularly on a time schedule (weekly, daily, or more frequently as needed). The system is automatic, but it could be overridden by an operator to function in a manual mode. A distributive control system (DCS) or a programmable logic control (PLC) are the systems of choice to set operating parameters and to monitor and control this process. Such control systems are normally remote from the storage facility and preferably in a central control room.

The solenoid is calibrated under controlled environment to lift a specified weight equivalent to the set pressure of the relief valve. Power is gradually applied and current is measured as a function of time to determine the lifting point. Graphical presentation of time versus electrical current indicates asymptotic behavior to a point where the weight is disengaged from its resting position and lifting takes place. Thereafter, the current input becomes virtually constant. At the point of lifting, an overshoot in the current demand may occur. This is normally attributed to the additional force required to overcome adherence of the pallet to the seat, which could be a result of product or material deposited at the vent port. The calibration and graphical data are recorded and stored in the control system memory for future reference.

The control device applies power gradually, in accordance with a preset protocol, to energize the solenoid. The applied current is recorded and compared with the original calibration for determination of the set point pressure. The on-line measurements should match calibrated data and should be repeatable, unless the relief valve is malfunctioning. A measured current exceeding calibration data implies a condition in which the pallet is not opening properly, such as a buildup of material on the pallet causing it to stick in a closed position. On the other hand, a measured current that is less than expected indicates a mechanical failure in the pallet assembly, such as a loose rod or a broken compression spring. In all cases, the programmable control device will alert the operator to such failure and will keep record of every event that has been initiated.

It is possible to replace the magnetic coil 124 of the subject invention with magnetic means (not shown) which is able to impart a torque to the pallet shaft in order to free the pallet from a build up of sticky substances, such as some polymers, which will not release the pallet by a normal pulling force.

It is also possible to employ other non intrusive means, such as ultrasound or light beams, to generate an indication of an unplanned occurrence of valve lifting.

For environmental considerations, it would be preferable to avoid relief valve testing while the storage tank is experiencing a surge in pressure. In such a case, it will be necessary to integrate real time tank pressure measurements in the control scheme to override the normal sequence of relief valve testing. The present invention incorporates such pressure-measuring means.

The present invention is also able to monitor all planned and unplanned relief valve lifting events. The signal from the magnetic displacement indicator is transmitted to the program control system to alert the system's operator of each such occurrence.

The present invention is designed to meet required classification for any operating facility or conditions. For example, the invention meets the requirements for National Fire Protection Association (NFPA) by having all possible spark-initiating elements contained within an explosion proof housing and/or conduits. The system is provided with means for purging the relief valve housing with air or inert gas to prevent any ignition of gases by any sparking which might occur.

It will be appreciated from the foregoing discussion that the present invention is readily adaptable for function verification of different types of low-pressure relief protection valves. It will operate remotely to verify the capabilities of these relief valves in automatic or manual mode. The present invention is suitable for operation in hazardous services. The present invention may be subject to many modifications and changes without departing from the spirit or essential characteristics thereof The above described embodiments should therefor be considered in all respects as being illustrative and not restrictive of the scope of the present invention as defined by the appended claims.

I claim:

1. An improved relief valve for relieving pressure differentials in storage vessels having an internal pressure 15 psig or less, which valve provides verification of its functional readiness for opening, each said relief valve comprising:

housing means defining a chamber with an input, an output, and a valve seat within said chamber;

pallet assembly means mounted within said chamber for movement with respect to said valve seat to effect the opening and closing thereof; and means biasing said pallet assembly means to a normally closed position;

first magnetically inductive circuit means acting upon said pallet assembly means to periodically test the operational condition of said valve by opening it; and second magnetically inductive circuit means responsive to movement of said pallet assembly to thereby verify proper operation and opening of said valve.

2. An improved relief valve according to claim 1, wherein said relief valve is a positive pressure relief valve.

3. An improved relief valve according to claim 2, wherein said means biasing said pallet assembly is a weight or spring the force of which is predetermined.

4. An improved relief valve according to claim 1, wherein said relief valve is a negative pressure relief valve.

5. An improved relief valve according to claim 4 wherein said means biasing said pallet assembly is a weight the size of which is predetermined.

6. An improved relief valve according to claim 1 further comprising means to activate said first magnetically inductive circuit means on a periodic basis.

7. An improved relief valve according to claim 1 further comprising means to activate said first magnetically inductive circuit means in response to a command.

8. An improved relief valve according to claim 1 wherein said first magnetically inductive circuit means comprises:

an external solenoid coil means surrounding shaft means of said pallet assembly and, when energized, utilizing said shaft means as the armature of said solenoid whereby activation of said solenoid coil causes said pallet assembly to open said relief valve.

9. An improved relief valve according to claim 1 further comprising:

permanent magnet means mounted on said shaft means of said pallet assembly; and electrical coil means mounted about said shaft means, whereby movement of said shaft causes said permanent magnet means to cut flux paths of said coil thereby generating an output indicative of pallet movement and thus valve opening.

10. An improved relief valve according to claim 1 wherein said first magnetically inductive circuit means further comprises:

means to measure the electrical force necessary to cause said shaft means of said pallet assembly to move to vent the vessel.

11. An improved relief valve according to claim 1 wherein said first magnetically inductive circuit means comprises:

electrically operated tractive force means for overcoming the set pressure imposed on relief valve by means of a weight or a spring.

12. An improved relief valve according to claim 1 wherein said second magnetically inductive circuit means including means for indicating each occurrence of valve lifting as a result of changes in storage vessel pressure.

13. An improved relief valve according to claim 1 wherein said first magnetically inductive circuit means includes pressure measurement means for overriding system operating sequencing.

14. An improved relief valve according to claim 1 further comprising programmable control means for data acquisition and system control.

15. An improved relief valve according to claim 1 further comprising;

explosion proofing means for safe system operation.

16. An improved relief valve according to claim 1 further comprising:

means to purge said valve with slightly pressurized inert gas whereby intrusion of flammable gases into the valve housing is prevented.

17. An improved relief valve according to claim 16 wherein said gas in an inert gas.

18. In combination with a relief valve for relieving pressure differentials in storage vessels having an internal pressure 15 psig or less, each said relief valve having housing means defining a chamber with an input, an output, and a valve seat within said chamber, pallet assembly means mounted within said chamber for movement with respect to said valve seat to effect the opening and closing thereof; and means biasing said pallet assembly means to a normally closed position, a device for determining and assuring the functionality of said relief valve, said device comprising:

first magnetically inductive circuit means acting upon said pallet assembly means to periodically test the operational condition of said valve by opening it; and second magnetically inductive circuit means to thereby verify proper operation and opening of said valve.

19. The combination according to claim 18, wherein said relief valve is a positive pressure relief valve and said means biasing said pallet assembly is a weight or spring the force of which is determined by the set point requirements.

20. The combination according to claim 18, wherein said relief valve is a negative pressure relief valve and said means biasing said pallet assembly is a weight the size of which is determined by the set point requirements.

21. The combination according to claim 18 further comprising means to activate said first magnetically inductive circuit means on a periodic basis.

22. The combination according to claim 18 further comprising means to activate said first magnetically inductive circuit means in response to remote operator actuation.

23. The combination according to claim 18 wherein said first and second magnetically inductive circuit means each comprises:

solenoid coil means surrounding shaft means of said pallet assembly and, when energized, utilizing said shaft means as the armature of said solenoid whereby activation of said solenoid coil causes said pallet assembly to open said relief valve.

24. The combination according to claim 18 according to claim 1 further comprising:

permanent magnet means mounted on said shaft means of said pallet assembly; and electrical coil means mounted about said shaft means, whereby movement of said shaft causes said permanent magnet means to cut flux paths of said coil thereby generating an output indicative of pallet movement and thus valve opening.

25. The combination according to claim 18 wherein said first magnetically inductive circuit means further comprises:

means to measure the electrical force necessary to cause said shaft means of said pallet assembly to move to vent the vessel.

26. The combination according to claim 18 wherein said first magnetically inductive circuit means comprises:

electrically operated tractive force means for overcoming the set pressure imposed on relief valve by means of a weight or a spring.

27. The combination according to claim 18 wherein said second magnetically inductive circuit means including means for indicating each occurrence of valve lifting as a result of changes in storage vessel pressure.

28. The combination according to claim 18 further comprising means for indicating each occurrence of valve lifting as a result of changes in storage vessel pressure.

29. The combination according to claim 28 wherein said means for indicating each occurrence of valve lifting is ultrasonic.

30. The combination according to claim 28 wherein said means for indicating each occurrence of valve lifting is ultrasonic.

31. The combination according to claim 18 wherein said second magnetically inductive circuit means includes pressure measurement means for overriding normal system operating sequencing.

32. The combination according to claim 31 wherein said gas in an inert gas.

33. The combination according to claim 18 further comprising programmable control means for data acquisition and system control.

34. The combination according to claim 18 further comprising:

explosion proofing means for safe system operation.

35. The combination according to claim 18 comprising:

means to purge said valve with slightly pressurized inert gas whereby intrusion of flammable gases into the valve housing is prevented.

36. A method for assuring the operability of relief valve for relieving pressure differentials in storage vessels and the like, each said relief valve having housing means defining a chamber with an input, an output, and a valve seat within said chamber, pallet assembly means mounted within said chamber for movement with respect to said valve seat to effect the opening and closing thereof; and means biasing said pallet assembly means to a normally closed position, a device for determining and assuring the functionality of said relief valve, said method comprising:

providing said relief valve with first magnetically inductive circuit means for acting upon said pallet assembly means;

providing said relief valve with second magnetically inductive circuit means responsive to movement of said pallet assembly;

measuring the electrical force required to actuate said relief valve, under normal circumstances, and storing this data; and periodically energizing said first magnetically inductive circuit means to actuate said relief valve and comparing the electrical force required to the stored data whereby forces significantly different from the stored data indicate faulty valve operation.

* * * * *

UNITED STATES PATENT AND TRADEMARK OFFICE
CERTIFICATE OF CORRECTION

PATENT NO. : 6,019,126
DATED : Feb. 1, 2000
INVENTOR(S) : Maher I. Kelada

It is certified that error appears in the above-identified patent and that said Letters Patent is hereby corrected as shown below:

Column 12, line 19 (Claim 30, line 3) delete "ultrasonic" and insert --light beam projector and receptor means.--

Signed and Sealed this

Twenty-first Day of November, 2000

Attest:

Q. TODD DICKINSON

*Attesting Officer*  *Director of Patents and Trademarks*